(12) United States Patent
Buss

(10) Patent No.: US 6,357,179 B1
(45) Date of Patent: Mar. 19, 2002

(54) SELF-WATERING PLANTER

(75) Inventor: Melvin H. Buss, Burlington, VT (US)

(73) Assignee: America's Gadening Resource, Inc., Burlington, VT (US)

( * ) Notice: Subject to any disclaimer, the term of this patent is extended or adjusted under 35 U.S.C. 154(b) by 0 days.

(21) Appl. No.: 09/523,351

(22) Filed: Mar. 10, 2000

Related U.S. Application Data

(60) Provisional application No. 60/124,071, filed on Mar. 12, 1999.

(51) Int. Cl.[7] .................................................. A01G 9/02
(52) U.S. Cl. ............................. 47/65.5; 47/79; 47/86; 47/66.1
(58) Field of Search ..................... 47/79, 66.1, 66.2, 47/71, 81, 59, 65.5

(56) References Cited

U.S. PATENT DOCUMENTS

| | | | |
|---|---|---|---|
| 536,908 A | 4/1895 | Bailey | |
| 2,150,605 A | 3/1939 | Lester | 47/38 |
| 2,639,549 A | 5/1953 | Wubben et al. | 47/1.2 |
| 3,271,900 A | 9/1966 | Mori | 47/38.1 |
| 3,552,058 A | * 1/1971 | Fici | |
| 3,604,150 A | 9/1971 | Baumann | 47/34 |
| 4,379,375 A | 4/1983 | Eisenberg et al. | 47/65 |
| 4,445,623 A | * 5/1984 | Kolling et al. | 220/343 |
| 4,597,220 A | 7/1986 | Bourriéet al. | 47/27 |
| 4,885,870 A | 12/1989 | Fong | 47/79 |
| 5,129,181 A | 7/1992 | Kafka et al. | 47/64 |
| 5,225,342 A | 7/1993 | Farrell | 435/240.45 |
| 5,451,443 A | 9/1995 | Wechsler | 428/99 |
| 5,842,310 A | 12/1998 | Liu et al. | 47/59 |
| 5,921,025 A | 7/1999 | Smith | 47/79 |
| 6,134,833 A | * 10/2000 | Bachman et al. | 47/80 |

* cited by examiner

Primary Examiner—Peter M. Poon
Assistant Examiner—Andrea M. Valenti
(74) Attorney, Agent, or Firm—Downs Rachlin & Martin PLLC

(57) ABSTRACT

A self-watering planter (20) having a container (22) and a floor structure (60). The latter includes one or more troughs (80) that extend downwardly from floor (70). When manufacture of the planter is complete, a chamber portion (28a) for receiving planting medium (100) is provided above the floor. This chamber portion includes interior regions (82) of the troughs. A lower chamber portion (28b) is provided beneath the floor structure for receiving water. Openings (96, 97) in bottom ends (84) of troughs (80) permit water in the lower chamber portion to be wicked up into the planting medium in the troughs, which in turn is wicked up into planting medium in upper portions of the upper chamber portion. The planter is designed to be manufactured with a single mold in a single molding operation.

10 Claims, 4 Drawing Sheets

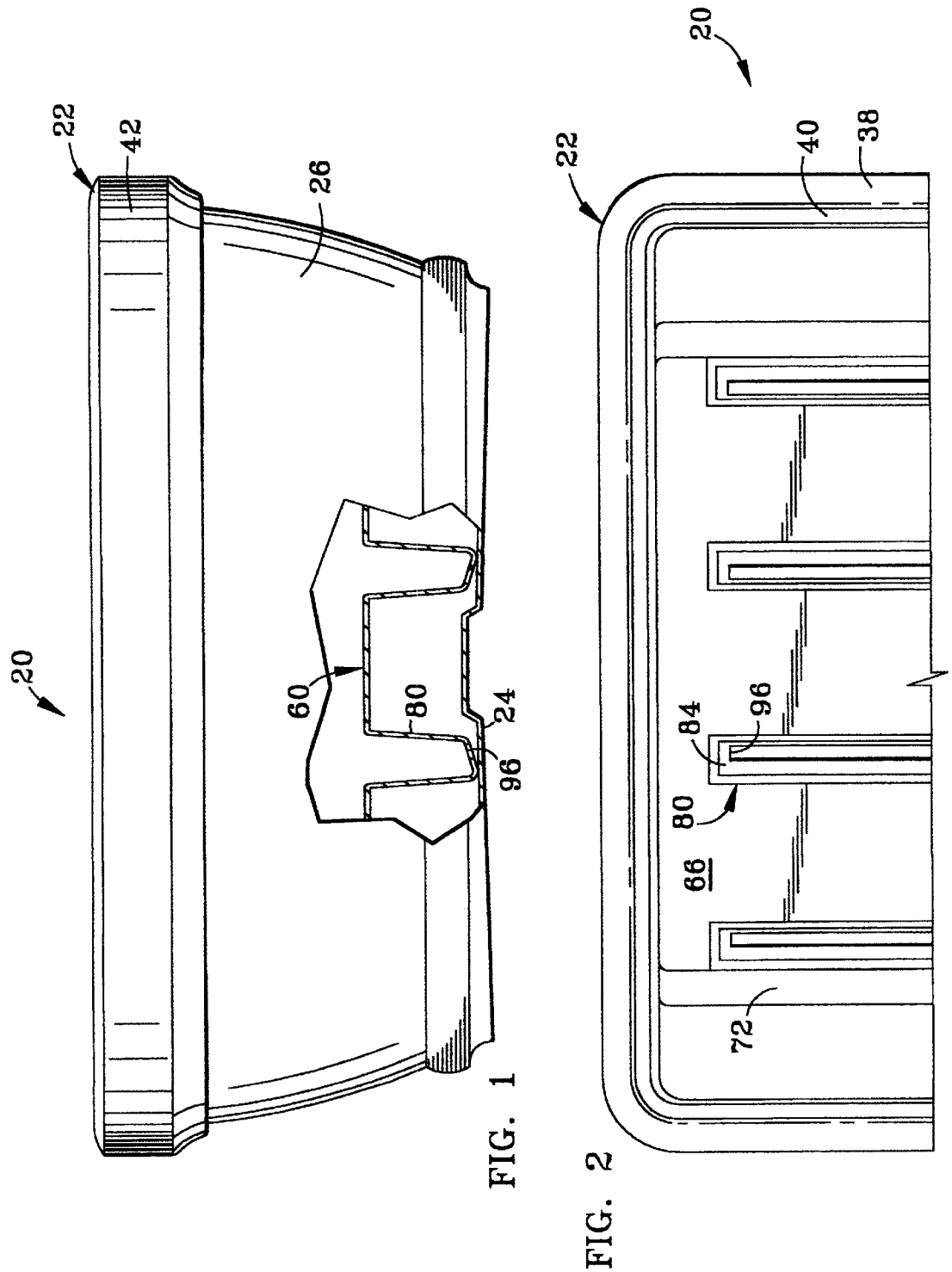

SELF-WATERING PLANTER

CROSS REFERENCE TO RELATED APPLICATION

This application claims the benefit of U.S. Provisional Application Ser. No. 60/124,071, filed Mar. 12, 1999.

FIELD OF THE INVENTION

The present invention relates to containers for growing plants, which containers have a lower water reservoir for delivering moisture to an upper soil-containing chamber in which the plants grow.

BACKGROUND OF THE INVENTION

Because of the importance of delivering sufficient moisture to plants grown in a container, self-watering container systems (also known as planter systems) have been developed. These systems include a lower reservoir for storing water, an upper soil-containing chamber for growing plants, and various mechanisms for transferring moisture from the reservoir to the soil in the soil-containing chamber.

Known self-watering container systems typically do not have a sufficiently large reservoir proportionate to the volume of soil in the soil-containing chamber. As a consequence it is necessary to refill the reservoir more frequently than is desired, e.g., 2–3 times a day under certain circumstances. This reduces the benefit of the self-watering aspect of self-watering container systems. For example, U.S. Pat. No. 3,604,150 to Baumann describes a self-watering container system in which the volume of the lower reservoir is so small proportionate to the volume of soil that would typically be provided in the upper soil-containing chamber that use of such system would involve refilling the reservoir several times a day under certain growing conditions.

Another deficiency in known self-watering container systems is that the mechanism for transferring moisture to the soil-containing chamber does not transfer moisture in sufficient volumes or at sufficient rates to meet the needs of plants growing in the soil-containing chamber. This generally occurs because an insufficient portion of the soil in the soil-containing chamber is exposed to moisture in the reservoir. As a consequence, under certain growing conditions, even if the reservoir is full of water, insufficient moisture is delivered to the plants growing in the soil-containing chamber. For example, U.S. Pat. No. 3,271,900 to Mori describes a self-watering container having a lower water reservoir, a soil-containing chamber and two relatively small troughs extending downwardly from the chamber into the reservoir. The troughs have small slits through which moisture can pass from the reservoir into soil in the troughs. It is believed the size and number of troughs, and the size of the slits in the troughs, is insufficient to permit adequate moisture transfer via the troughs into the soil-containing chamber. In some cases, self-watering container systems suffer from both this problem and the problem described in the preceding paragraph.

It is also problematic if the soil-containing chamber in a self-watering container is exposed to too much moisture. In such case, the soil can become water-logged, thereby denying plants the carbon dioxide they need for survival.

Self-watering containers are well known. Unfortunately, because known self-watering containers typically suffer from one or more of the problems discussed above, their acceptance and use is not as widespread as possible.

Known self-watering containers typically include two parts, a lower container for holding water and a floor or planting tray for receiving soil and plants. Each of these parts is typically molded from plastic using a separate mold. Consequently, the total cost of manufacturing such containers typically requires amortization of two molds, and manufacturing throughput is limited by the need to form the two portions in separate manufacturing operations.

SUMMARY OF THE INVENTION

One aspect of the present invention is a self-watering planter. The planter comprises a reservoir for containing a first volume of water and a chamber for containing a second volume of planting medium positioned above the reservoir. The chamber includes a floor having a plurality of apertures extending therethrough. The planter includes a plurality of troughs, each having an open top end, a closed bottom end, an interior region for containing planting medium and at least one opening in the bottom end. The top end of each of the plurality of troughs is attached to the floor in alignment with one of the plurality of apertures so that its interior region is in communication with the chamber and each trough extends downwardly into the water reservoir. The interior regions in the plurality of troughs together contain a third volume of soil. The first volume is about 0.17 to 2 times the combination of the second volume and the third volume. The at least one openings in the plurality of troughs have a combined area that is 0.0005 to 0.030 inches$^2$ per inch$^3$ of the second volume, and the third volume is 2–11% of the second volume.

Another aspect of the present invention is a method of making a self-watering planter. The method includes the step of forming, in a single molding operation, a planter having a container with a bottom portion, a floor attached to the container, and an inner chamber positioned between the bottom portion and the floor. Next, the floor is separated from the container. Finally, the floor is positioned adjacent the bottom portion.

Still another aspect of the present invention is a self-watering planter that comprises a container having a bottom portion and a wall attached to the bottom portion so as to extend upwardly from the bottom portion. The planter includes a floor having a peripheral portion via which the floor is attached to the wall. The floor includes at least one trough extending downwardly toward the bottom portion, and the at least one trough has a bottom end. The floor is sized so that when it is detached at the peripheral portion from the wall and allowed to drop in the container toward the bottom portion so that the bottom end of the at least one trough is proximate the bottom portion, the peripheral portion engages the inner surface so as to limit planting medium positioned above the floor from passing past the floor and toward the bottom portion.

BRIEF DESCRIPTION OF THE DRAWINGS

FIG. 1 is a side-elevation view of one side of the self-watering container of the present invention, with a portion of the container being broken away to reveal interior construction details;

FIG. 2 is a top view of one half of the container of FIG. 1, the other half not being illustrated as the container is symmetrical about its center line;

DETAILED DESCRIPTION OF THE INVENTION

Figure 3:
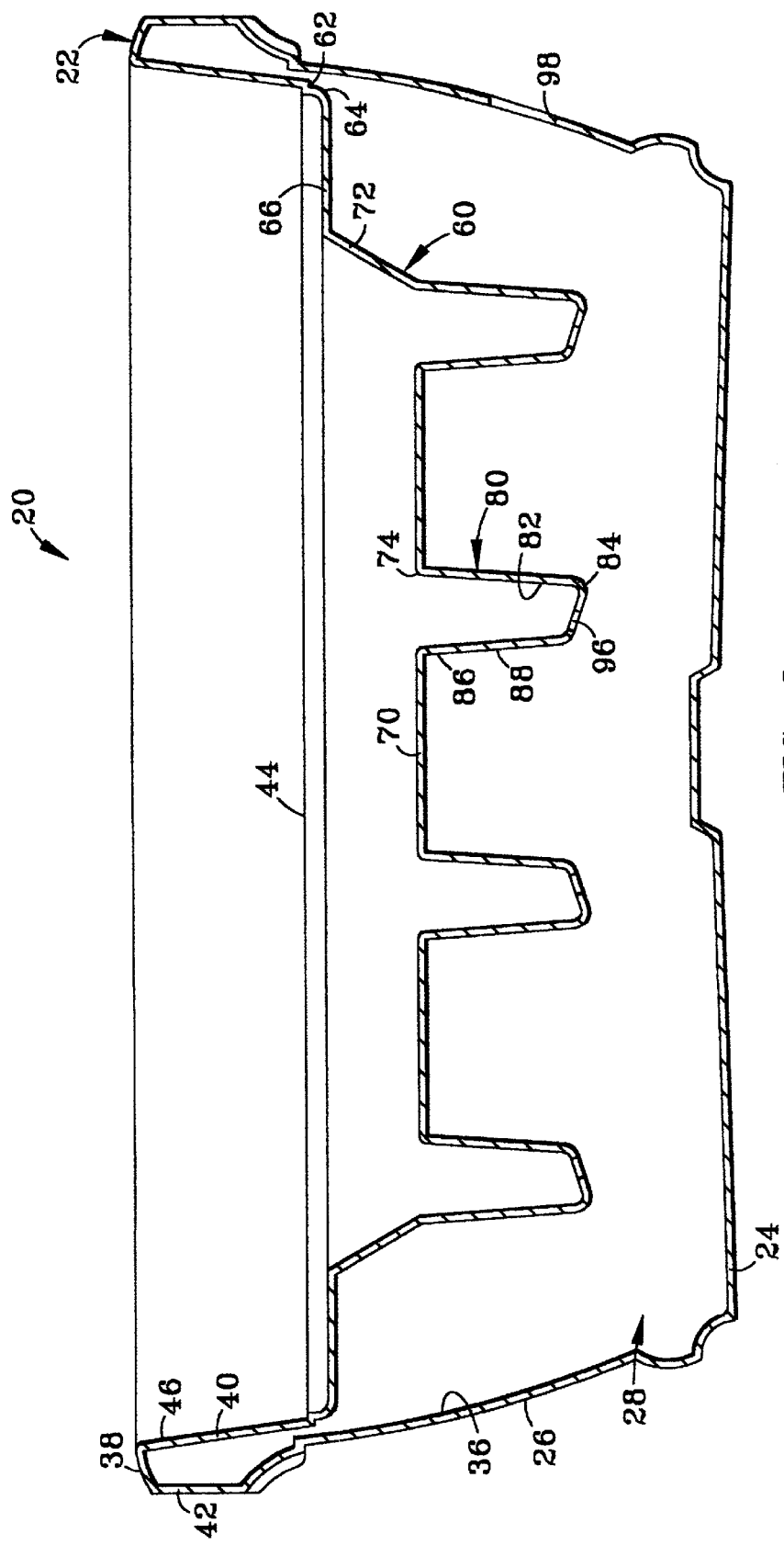
FIG. 3 is a cross-sectional view of the container of FIG. 1 after the container is molded, but before the floor structure is separated.

Referring to FIGS. 1–3, the present invention is a self-watering planter 20, which may be used either inside or outside a house, business or other structure. Planter 20 includes a container 22 having a base 24 and a wall 26 attached to the base and extending upwardly therefrom. Base 24 and wall 26 together define a water-tight chamber 28. Wall 26 has an inner surface 36, a top rim portion 38 and inner wall portion 40 attached to the top rim portion so as to extend downwardly therefrom into chamber 28. Thus, inner wall portion 40 extends adjacent, but is spaced from, upper portion 42 of wall 26. Inner wall portion 40 terminates at its lower end at line 44 and defines an opening 46 at the top of container 22. Preferably, inner wall 26 tapers inwardly toward base 24.

Planter 20 also includes floor structure 60. The latter includes a peripheral portion 62 which, when planter 20 is first manufactured, is attached to inner wall portion 40 at line 44. Peripheral portion 62 preferably has a curved surface 64 immediately below line 44. Floor structure 60 includes a shelf 66 immediately inward of peripheral portion 62. Peripheral portion 62 defines the outer dimension of shelf 66. The dimension of shelf 66, as measured from left to right between peripheral portion 62, as viewed in FIG. 3, is an important aspect of the present invention which is discussed below in connection with the description of the method of making planter 20.

Floor structure 60 also includes a floor 70 and a wall 72 connecting floor 70 with shelf 66. Floor 70 includes at least one, and preferably a plurality of, apertures 74 extending therethrough.

In addition, floor structure 60 comprises at least one, and preferably a plurality of, troughs 80. It is preferred that troughs 80 have a long, narrow configuration, as illustrated best in FIG. 2, although the present invention encompasses other configurations. Each trough 80 has an interior region 82, a closed bottom end 84, and an open top end 86. Bottom end 84 is preferably angled with respect to the plane of floor 70, so that one side of the narrow dimension of the bottom end is closer to base 24 than the other side.

Troughs 80 are attached to floor 70 so that top end 86 is aligned with and positioned immediately beneath one of apertures 74. Top end 86 and its associated aperture 74 are sized and configured so that interior region 82 communicates with the region above floor 70. Preferably, although not necessarily, sidewalls 88 of trough 80 taper inwardly from top end 86 to bottom end 84.

Turning now to FIGS. 1–5, bottom end 84 of trough 80 includes openings 96 and 97 that extend along the length of the trough. The length of openings 96 and 97 will vary with the length of trough 80. Preferably, openings 96 and 97 have a width in the range 0.125" to 0.675", although this range does not represent an absolute limit. While the use of openings 96 and 97 is preferred, in some cases it may be desirable to provide only one opening, or three or more openings, in bottom end 84. The total area of all of the openings 96 and 97 in troughs 80 is preferably about 0.0005 inch$^2$ to 0.030 inch$^2$ for each cubic inch of volume of chamber portion 28a (FIG. 4a). The latter is that portion of chamber 28 extending downwardly from rim portion 38 to floor 70, and including interior regions 82 of troughs 80. In one embodiment of planter 20, the total area of openings 96 is about 30 inch$^2$ and the volume of chamber portion 28a is about 2,600 inch$^3$.

Figure 4:
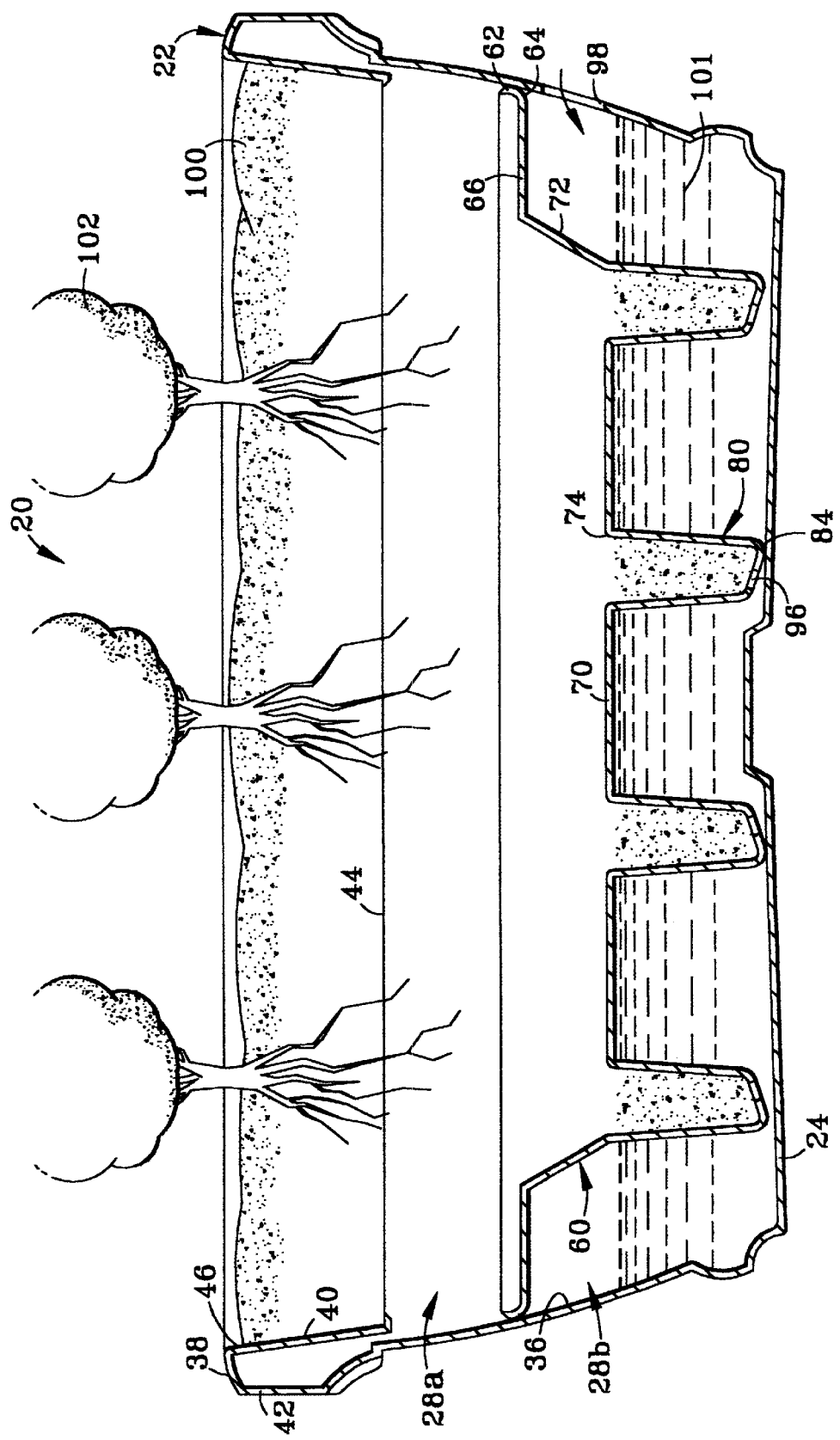
FIG. 4 is identical to FIG. 3, except that the floor structure has been separated from the rest of the container and rests in the bottom of the water reservoir, and the planting medium, plants and water are shown.
Figure 5:
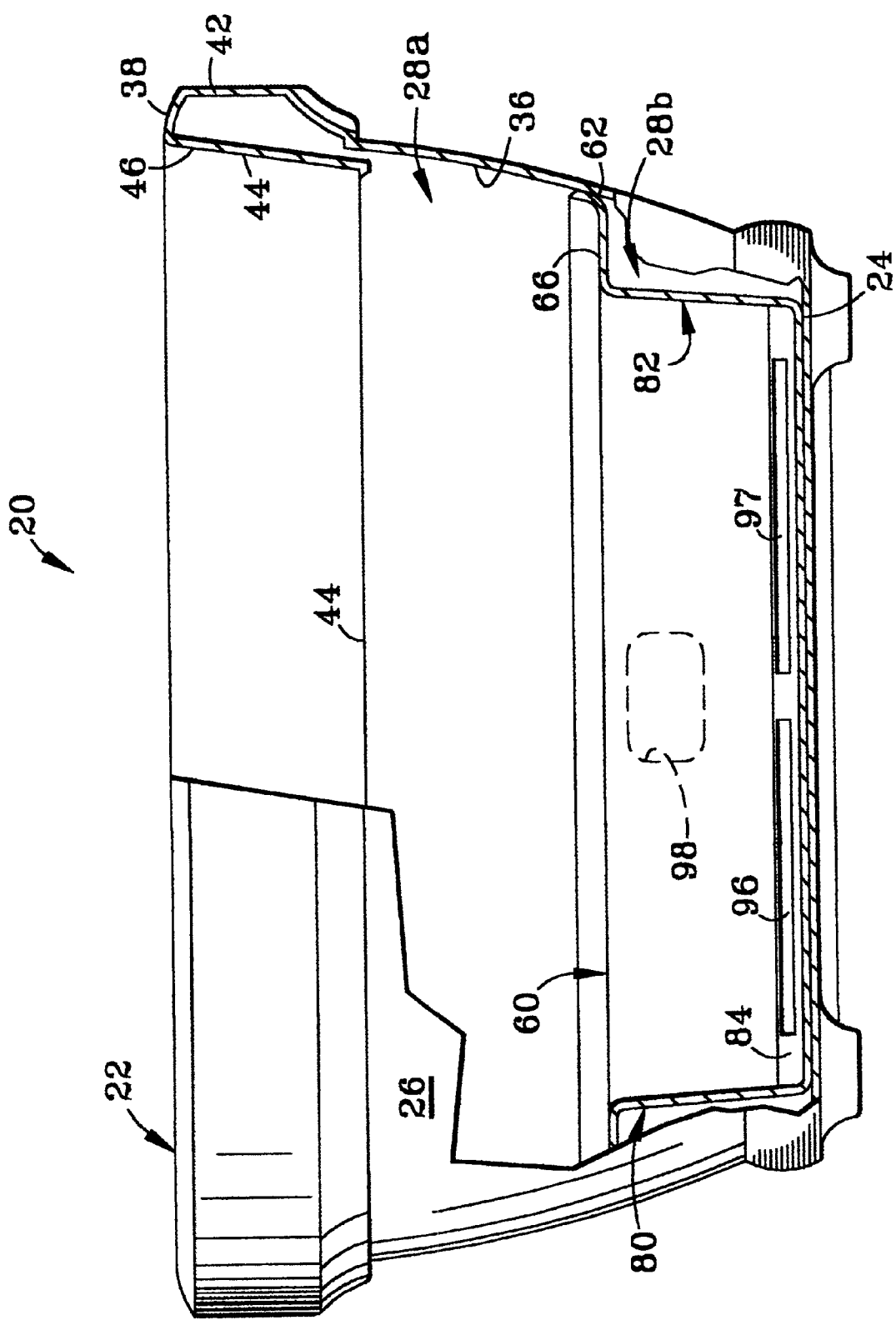
FIG. 5 is a side-elevation view of the another side of the container of FIG. 1, with a majority of the sidewall being broken away to reveal interior construction details.

Concerning other important dimensions of planter 20, the total volume of interior regions 82 of all the troughs 80 is about 2–11% of the total volume of chamber portion 28a. In one embodiment of the invention, this ratio is about 5%. The total volume of chamber portion 28a will vary widely depending upon the number and size of plants to be grown in planter 20, but volumes in the range of 500–30,000 inch$^3$ are typical. Troughs 80 preferably have a width of about 0.75" to 3" at open ends 86, and a depth, as measured between the bottom of floor 70 and the lowest side of bottom end 84 of about 1" to 6". When floor structure 60 is positioned as illustrated in FIG. 4, as described in more detail below, chamber portion 28b has a volume that is about 0.17 to 2 of the volume of chamber portion 28a. The specific volume ratio will vary depending upon the desired watering intervals, planter size and other parameters. Chamber portion 28b is that portion of chamber 28 beneath floor structure 60, when the floor structure is positioned as illustrated in FIG. 4. An opening 98 is provided in wall 26 beneath shelf 66, when positioned as illustrated in FIG. 4, for filling chamber portion 28b.

An important aspect of planter 20 is that it is designed to be easily and inexpensively manufactured. Planter 20 is preferably made from a plastic resin powder, such as powdered polyethylene or polypropylene. Next, using a single mold and a single molding operation, the starting material is formed into planter 20 illustrated in FIG. 3. Preferably, a rotational molding process is used where the plastic resin is loaded into the single mold, the mold is moved into a heated oven, and then the mold is rotated horizontally and vertically. The mold remains in the oven while the temperature is ramped down. Once the parts are cooled they are released from the mold. In some cases, it may be desired to produce two or more planters 20 using a single, multiple-cavity mold.

Next, floor structure 60 is separated from inner wall portion 40 by a cutting the floor structure away from the inner wall portion along line 44. This cutting operation may be performed manually with a knife, or with powered rotary or reciprocating cutters. Floor structure 60 is then allowed to drop down in chamber 28 until at least some of bottom ends 84 of troughs 80 rest on base 24. In some cases it may be desirable to angle base 24 slightly, as shown in FIGS. 3 and 4, in which case not all bottom ends 84 will contact the base.

Shelf 66, as measured between peripheral portions 62, is sized so that when bottom ends 84 contact base 24, the shelf contacts inner surface 36. In particular shelf 66 is sized and configured to contact inner surface 36 along all of peripheral portion 62 to as to limit the passage of planting medium 100 (FIG. 3) in chamber portion 28a from traveling past the shelf into chamber portion 28b. In some cases, it may be desirable to size the depth of troughs 80 so that when shelf contacts inner surface 36, bottom ends 84 do not actually touch base 24. However, with such alternative design it is desirable that bottom ends 84 be positioned relatively close to base 24.

Referring to FIG. 4, in use chamber 28a, including interior regions 82 in troughs 80, is filled with planting medium 100, which may comprise top soil, soil-less planting compositions and other materials in which plants may be grown. Regardless of the material chosen, it is important that planting medium 100 have reasonable moisture retention properties. Chamber portion 28b is then filled with water 101 via opening 98 in wall 26. Next, seeds (not shown) or plants 102 are planted in planting medium 100.

Because planting medium 100 located immediately above openings 96 in troughs 80 is in contact with the water in chamber portion 28b, such planting medium wicks Lip water through the openings and so becomes moistened. Moisture is then transferred by wicking action to planting medium 100 in upper portions of troughs 80, with additional water being wicked from chamber portion 28b by planting medium in lower portions of the troughs. Because troughs 80 are open on top and communicate with regions of chamber portion 28a above floor 70, moisture is transferred from planting medium 100 in troughs 80 to planting medium in the upper regions of chamber portion 28a, typically until all planting medium 100 moistened. Over time water in chamber portion 28b will become depicted due to absorption of the water by seeds and plants 102 in chamber portion 28a, and due to evaporation of moisture from planting medium 100. By sizing shelf 66 so that it engages inner surface 36 along substantially the entire peripheral portion 62, the passage of planting medium 100 past floor structure 60 and into water 101 is restricted.

The configuration and relative dimensions of the elements of planter 20 are selected so that greater moisture transport is achieved than is believed to be possible with other known self-watering planters. This reduces the likelihood of seeds and plants in planter 20 suffering from insufficient moisture.

Furthermore, the design of planter 20 permits easy and inexpensive manufacture. Only one mold is required to make the entire planter 20, which can significantly increase manufacturing throughput. If additional increases in throughput are desired, multiple cavities may be provided in the mold, permitting the manufacture of multiple planters 20 simultaneously. Also, there is no waste material from trimming operations associated with the manufacture of components of conventional self-watering planters. In addition, the design of planter 20 permits multiple planters to be stacked in nested relationship, which reduces packaging and shipping expenses.

While the present invention has been described in connection with a preferred embodiment, it will be understood that it is not so limited. On the contrary, it is intended to cover all alternatives, modifications and equivalents as may be included within the spirit and scope of the invention as defined in the appended claims.

What is claimed is:

1. A self-watering planter comprising:
    a. a reservoir for containing a first volume of water;
    b. a chamber for containing a second volume of planting medium positioned above said reservoir, said chamber including a floor having a plurality of apertures extending therethrough;
    c. a plurality of troughs, each having an open top end, a closed bottom end, an interior region for containing planting medium and at least one opening in said bottom end, wherein said top end of each of said plurality of troughs is attached to said floor in alignment with one of said plurality of apertures so that its interior region is in communication with said chamber and said each trough extends downwardly into said water reservoir, said interior regions in said plurality of troughs together containing a third volume of planting medium;
    d. wherein said first volume is at least 0.17 to 2 times the combination of said second volume and said third volume, said at least one openings in said plurality of troughs have a combined area that is 0.0005 to 0.030 inches$^2$ per inch$^3$ of said second volume, and said third volume is 2–11% of said second volume.

2. A self-watering planter according to claim 1, wherein said bottom ends have a long dimension and a short dimension, and said short dimension is inclined relative to a plane lying along said floor.

3. A self-watering planter according to claim 1, wherein said combination of said second volume and said third volume ranges from 500 to 30,000 inch$^3$.

4. A self-watering planter according to claim 1, wherein said reservoir has a bottom interior surface and said plurality of troughs extend downwardly toward a location proximate said bottom interior surface.

5. A method of making a self-watering planter, the method comprising the steps of:
    a. forming in a single molding operation a planter having a container with a bottom portion, a floor attached to the container, and an inner chamber positioned between the bottom portion and the floor;
    b. separating the floor from the container; and
    c. positioning the floor adjacent the bottom portion.

6. A method according to claim 5, wherein said molding operation is a rotational molding operation.

7. A method according to claim 5, wherein said separating step is performed by cutting the floor away from the container.

8. A method according to claim 5, wherein said forming step is performed using a single mold.

9. A self-watering planter, comprising:
    a. a container having a bottom portion and a wall attached to said bottom portion so as to extend upwardly from said bottom portion, said wall having an inner surface;
    b. a floor having a peripheral portion via which said floor is attached to said wall, said floor including at least one trough extending downwardly toward said bottom portion, said at least one trough having a bottom end; and
    c. wherein said floor is sized so that when said floor is detached at said peripheral portion from said wall and allowed to drop in said container toward said bottom portion so that said bottom end of said at least one trough is proximate said bottom portion, said peripheral portion engages said inner surface so as to limit planting medium positioned above said floor from passing past said floor and toward said bottom portion.

10. A planter according to claim 9, wherein a first chamber is provided beneath said floor in said container when said peripheral portion is detached from said wall and engages said inner surface, said first chamber having a first volume, and a second chamber is provided above said floor in said container, said second chamber having a second volume, further wherein said first volume is about 0.17 to 2 times said second volume.

* * * * *

UNITED STATES PATENT AND TRADEMARK OFFICE
CERTIFICATE OF CORRECTION

PATENT NO. : 6,357,179 B1
DATED : March 19, 2002
INVENTOR(S) : Melvin H. Buss

It is certified that error appears in the above-identified patent and that said Letters Patent is hereby corrected as shown below:

<u>Title page,</u>
Item [73], Assignee, should read as follows -- America's Gardening Resource, Inc. --

Signed and Sealed this

Twelfth Day of October, 2004

JON W. DUDAS
*Director of the United States Patent and Trademark Office*